US011302100B2

(12) United States Patent
Heng

(10) Patent No.: US 11,302,100 B2
(45) Date of Patent: Apr. 12, 2022

(54) METHOD AND COMPUTING DEVICE IN WHICH VISUAL AND NON-VISUAL SEMANTIC ATTRIBUTES ARE ASSOCIATED WITH A VISUAL

(71) Applicant: ZRO Inc., Fukuoka (JP)

(72) Inventor: Tio Seng Heng, Kobe (JP)

(73) Assignee: ZRO, Inc., Fukuoka (JP)

( * ) Notice: Subject to any disclaimer, the term of this patent is extended or adjusted under 35 U.S.C. 154(b) by 0 days.

(21) Appl. No.: 17/292,727

(22) PCT Filed: Jul. 22, 2020

(86) PCT No.: PCT/JP2020/028576
§ 371 (c)(1),
(2) Date: May 11, 2021

(87) PCT Pub. No.: WO2021/020307
PCT Pub. Date: Feb. 4, 2021

(65) Prior Publication Data
US 2021/0357646 A1    Nov. 18, 2021

(30) Foreign Application Priority Data

Jul. 26, 2019  (JP) .............................. JP2019-138178

(51) Int. Cl.
*G06V 20/00*    (2022.01)
*G06F 16/583*   (2019.01)
(Continued)

(52) U.S. Cl.
CPC ............ *G06V 20/35* (2022.01); *G06F 16/583* (2019.01); *G06F 40/30* (2020.01); *G06K 9/6263* (2013.01); *G06V 10/34* (2022.01)

(58) Field of Classification Search
CPC .... G06K 9/00684; G06K 9/44; G06K 9/6263; G06F 16/583; G06F 40/30; G06V 20/35; G06V 10/34
See application file for complete search history.

(56) References Cited

U.S. PATENT DOCUMENTS

2008/0275694 A1    11/2008  Varone
2009/0094189 A1*    4/2009  Stephens ............... G06F 16/951
(Continued)

FOREIGN PATENT DOCUMENTS

GB    2547068 A    8/2017
JP    H 07-121548 A    5/1995
(Continued)

OTHER PUBLICATIONS

Karpathy Andrej et al, "Deep visual-semantic alignments for generating image descriptions", 2015 IEEE Conference on Computer Vision and Pattern Recognition (CVPR), IEEE, Jun. 7, 2015, pp. 3128-3137, XP032793761, DOI: 10.1109/CVPR.2015.7298932.

*Primary Examiner* — Casey L Kretzer
(74) *Attorney, Agent, or Firm* — Sonoda & Kobayashi Intellectual Property Law; Sarvajit S. Patil

(57) ABSTRACT

The present invention provides a method in which visual and non-visual semantic attributes are associated with a visual comprising preferably an input step, a preliminary visual processing step, a semantic concept processing step, a semantic context processing step, a semantic marker processing step, a semantic inheritance processing step, a semantic instance processing step, and a lexical functions step, as well as a computing device which is capable of performing said method.

8 Claims, 4 Drawing Sheets

(51) Int. Cl.
*G06F 40/30* (2020.01)
*G06K 9/62* (2022.01)
*G06V 10/34* (2022.01)

(56) References Cited

U.S. PATENT DOCUMENTS

2016/0063734 A1  3/2016  Divakaran et al.
2021/0034919 A1* 2/2021  Wu .................. G06N 5/022

FOREIGN PATENT DOCUMENTS

| | | |
|---|---|---|
| JP | H 11-213165 A | 8/1999 |
| JP | 2005-512213 A | 4/2005 |
| JP | 2013-101450 A | 5/2013 |
| JP | 2015-095155 A | 5/2015 |
| JP | 2016-085530 A | 5/2016 |
| JP | 2018-185795 A | 11/2018 |

* cited by examiner

[Fig. 1]
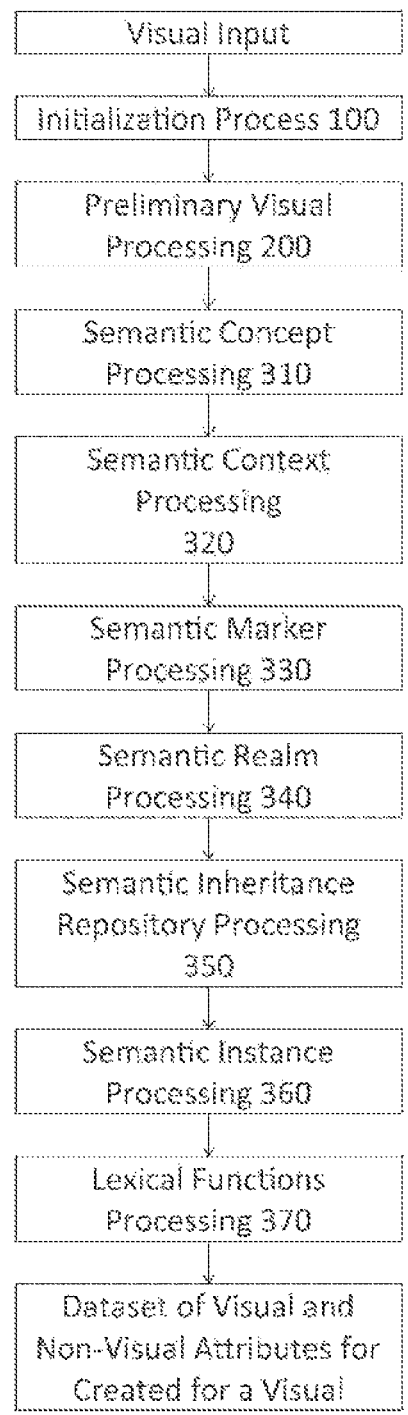

[Fig. 2]
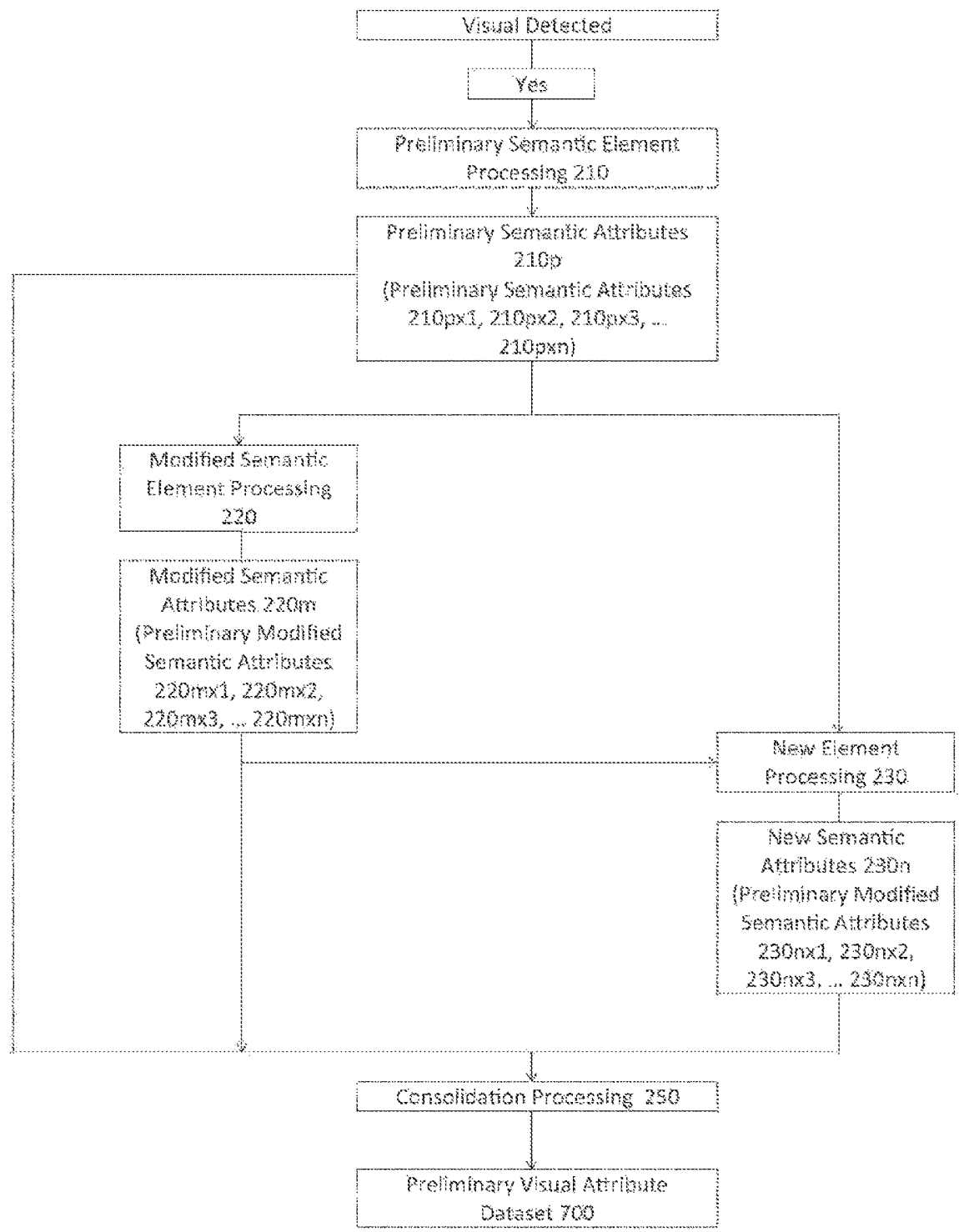

[Fig. 3]
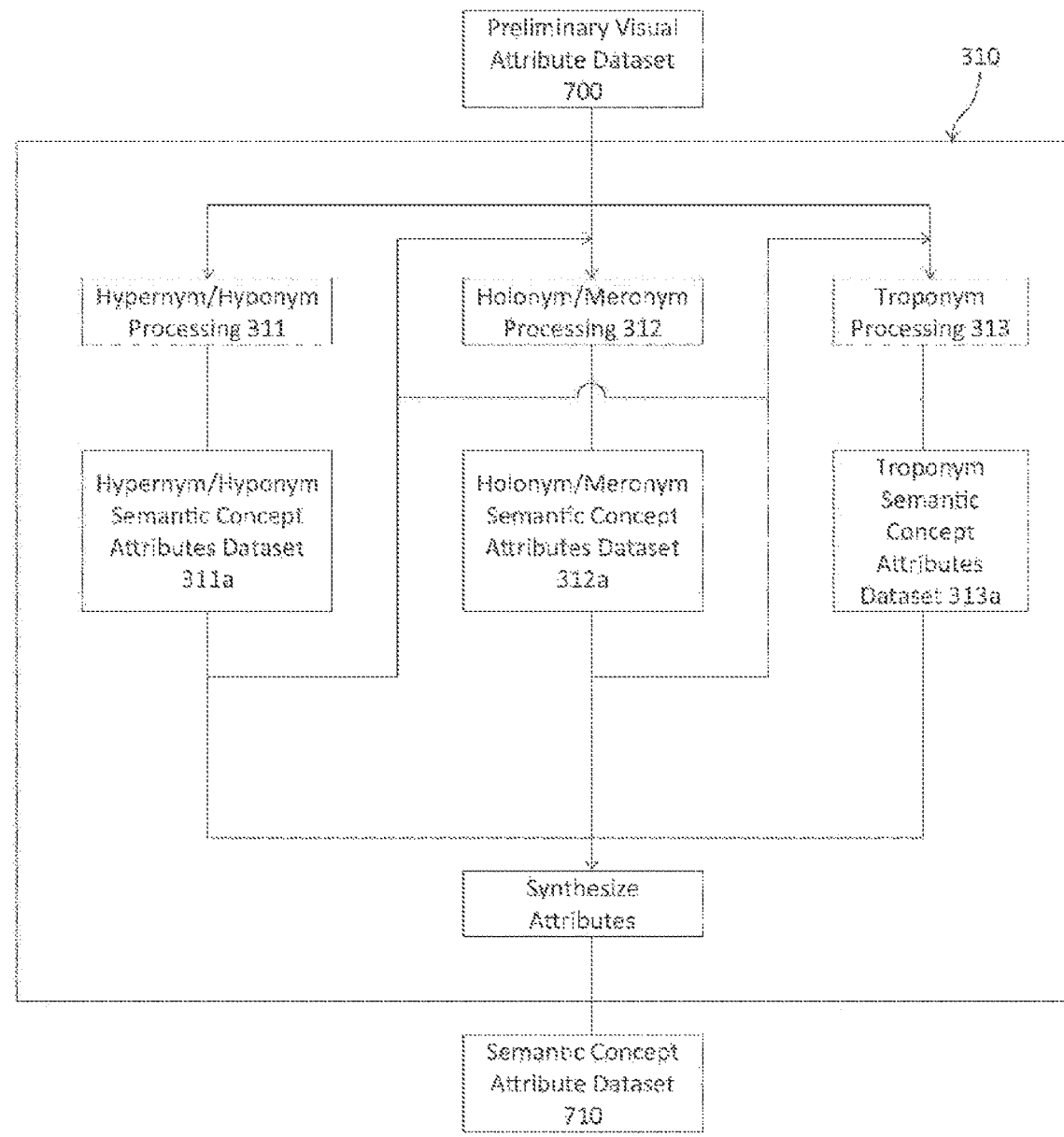

[Fig. 4]
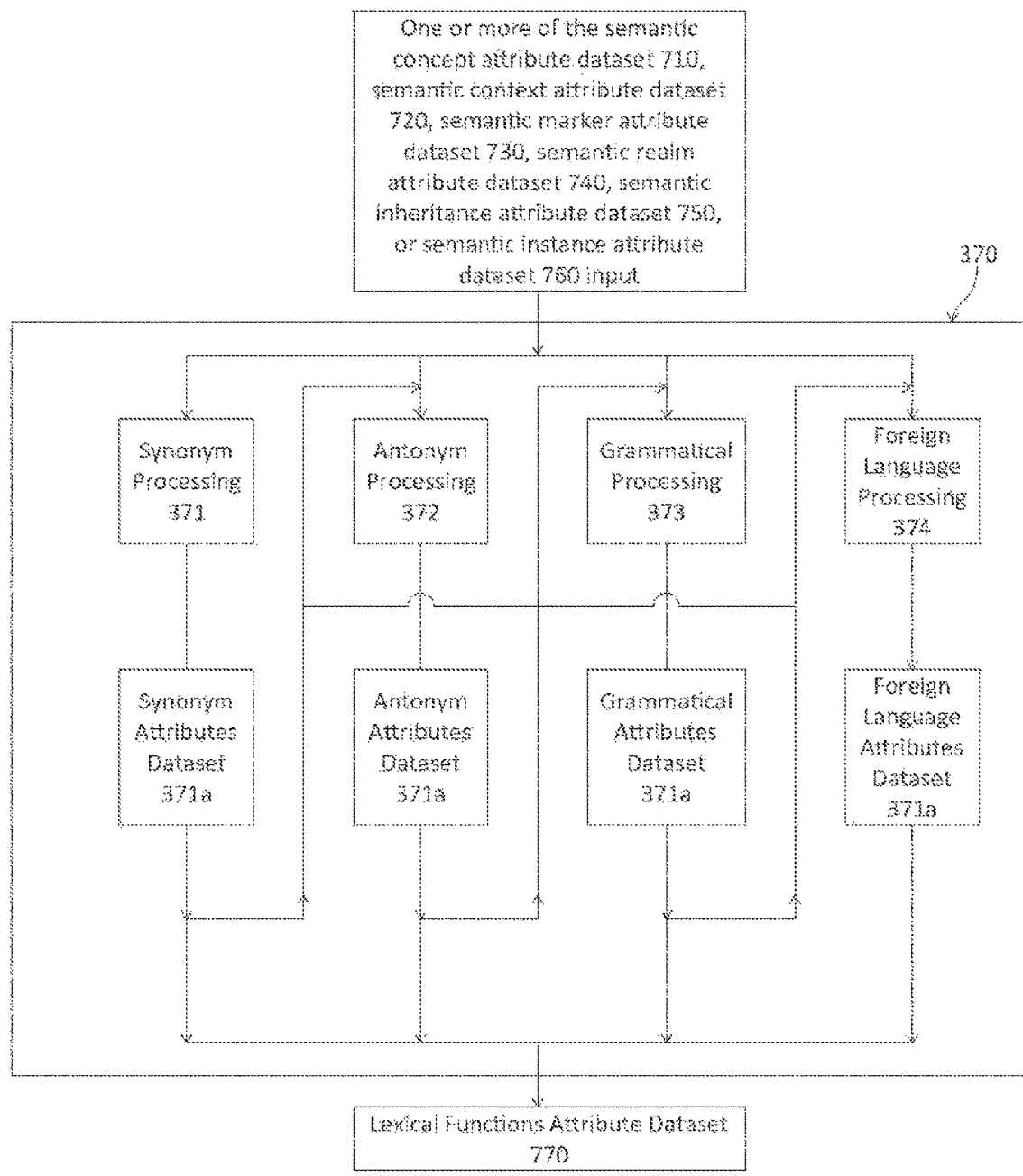

METHOD AND COMPUTING DEVICE IN WHICH VISUAL AND NON-VISUAL SEMANTIC ATTRIBUTES ARE ASSOCIATED WITH A VISUAL

TECHNICAL FIELD

The invention pertains to the field of visual semantics. More particularly, the invention pertains to in a digital medium classification environment, a method implemented by a computing device in which visual and non-visual semantic attributes are associated with a visual.

BACKGROUND OF THE INVENTION

Traditionally, when humans view an image several semantic elements are immediately noticed both visually and conceptually. An image may contain individual elements such as a drink, a plate of food, a table, and a person, and a person would immediately recognize this as a person having breakfast. A closer inspection of the food and drink would indicate that the food includes orange juice and oatmeal. Oatmeal and orange juice would then be known by a viewer as a healthy breakfast, and a dietician, for example, would also know that oatmeal contains important vitamins and minerals such as iron, zinc, and magnesium. On the other hand, a chef may see the oatmeal and know that the oatmeal in the photograph is rolled oats and not steel cut oats. The chef may also know that the oats were cooked using a liquid such as water or milk. For a human mind, an image can contain several immediate visual semantic elements, but also several conceptual elements and contextual relationships as well which are linked to the initial visual elements.

SUMMARY OF THE INVENTION

Currently, however, when an image is processed by a computer generally only the visual elements are catalogued and connected with the image. This limits the scope of connecting elements associated with an image. Moreover, in the event a search is conducted, a searcher must use the specific words tagged with a specific image in order to retrieve the image. Unfortunately, a searcher may not remember or know the primary search terms associated with an image, e.g. a specific name, but may remember only more generalized semantic attributes associated with an image.

Embodiments based on the present invention provides a method and computing device capable of implementing the method in which visual and non-visual semantic attributes are associated with a visual comprising preferably an input step, a preliminary visual processing step, a semantic concept processing step, a semantic context processing step, a semantic marker processing step, a semantic inheritance processing step, a semantic instance processing step, and a lexical functions step.

BRIEF DESCRIPTION OF DRAWINGS

FIG. 1 shows a block diagram of a preferable embodiment of a method implemented by at least one computing device in which visual and non-visual semantic attributes are associated with a visual in a digital medium classification environment.

FIG. 2 shows a block diagram of a preliminary visual processing.

FIG. 3 shows a block diagram of a semantic concept processing.

FIG. 4 shows a block diagram of a lexical function processing.

DETAILED DESCRIPTION OF THE INVENTION

The invention herein is preferably configured with an apparatus and method for processing semantic attributes of a visual in a computer system in which relevant visual and non-visual attributes to a user are extracted from a visual using semantic concepts and contexts. The processing is long term in that it operates on a continuing basis, and is both interactive and distributed in structure and method. That is, it is interactive in the sense that communication is substantially bi-directional at each level of processing, and it is distributed in that all or part of the processing can include purely hierarchical (parent-child) structure or method, a purely parallel (sibling) structure or method, or a combination of hierarchical and parallel structures and methods.

Also used herein, the term "user" refers to an individual or computer program in communication with a processor processing the visual.

Hereinafter, embodiments for carrying out the present invention will be described in detail with reference to the drawings.

Visual Input

As shown in FIG. 1 a visual is input into a processing system in a format capable of being detected by an initialization process 100. Input of a visual may be done manually or by an automated means such as by means of a machine input. A visual is defined as any graphic representation such as but not limited to a photo, picture, diagram, image, series of images, video, GIFs and/or still frames in a motion medium.

Preliminary Visual Processing

After a visual is detected by an initialization process, FIG. 1 further discloses that the visual undergoes a preliminary visual processing. FIG. 2 discloses that the preliminary visual processing 200 includes a preliminary semantic element processing 210, at least one of a modified semantic element processing 220 and a new semantic element processing 230, and a consolidation processing 250. The preliminary semantic element processing 210 processes the visual and generates a dataset of preliminary semantic attributes 210$p$ which describe the visible semantics of the processed visual. The dataset of preliminary semantic attributes 210$p$ may be described as a dataset having a primary preliminary semantic attribute 210$p$X1, a secondary preliminary semantic attribute 210$p$X2, a tertiary preliminary semantic attribute 210$p$X3, up to an n-th level preliminary semantic attribute 210$p$Xn in order of obviousness as generated by the preliminary semantic element processing 210. Preliminary semantic element processings 210 are known in the art, and an example of the preliminary semantic element processing 210 for generating a list of visible semantic elements is the Watson Visual Recognition™ software.

The modified semantic element processing 220 is a processing in which additional input or feedback is used to modify the results of the preliminary semantic element processing 210, i.e. the dataset of the preliminary semantic attributes 210$p$, by removing any unwanted preliminary semantic attributes 210$p$, or restricting specific preliminary semantic attributes 210$p$. The results of the modified semantic element processing 220 results in a dataset of modified semantic attributes 220m, which may be described as a dataset having a primary modified semantic attribute 220mX1, a secondary modified semantic attribute 220mX2, a tertiary modified semantic attribute 220mX3, up to an n-th level modified semantic attribute 220mXn in order of obviousness as generated by the modified semantic element processing 220. The modified semantic element processing 220 may be based on rules and restrictions provided by automatic machine input or by manual input from a user.

The new semantic element processing 230 is a processing in which additional new semantic attributes 230n are added to either the dataset of the preliminary semantic attributes 210p or the dataset of the modified semantic attributes 220m. The results of the new element processing 220 results in a dataset of new semantic attributes 230n, which may be described as a dataset having a primary new semantic attribute 230nX1, a secondary new semantic attribute 230nX2, a tertiary new semantic attribute 230nX3, up to an n-th level new semantic attribute 230nXn in order of obviousness as generated by the new semantic element processing 230. The additional new semantic attributes 230n may be included based on rules and restrictions provided by automatic machine input or by manual input from a user.

Resultant datasets are generated by the preliminary semantic element processing 210 and at least one of the modified semantic element processing 220 and the new semantic element processing 230; however, preferably, both the modified semantic element processing 220 and the new semantic element processing 230 are performed to generate datasets. The resultant datasets from the preliminary semantic element processing 210, the modified semantic element processing 220, and/or the new semantic element processing 230 are then subjected to a first consolidation processing 250.

The first consolidation processing 250 synthesizes the resultant datasets from the preliminary semantic element processing 210, the modified semantic element processing 220, and/or the new semantic element processing 230 by removing any redundant attributes and grouping related groups of attributes into more complex concepts or contexts, such as with grape and fennel being grouped under the attribute grape fennel salad. The attributes may remain as separate individual attributes as well as part of a group such as with the grape fennel salad grouping. The resultant dataset from this processing is the preliminary visual attribute dataset 700. Please note that any of the aforementioned datasets may be expressed as a short text when fast access or processing is required and/or when involving definitions from complex concepts or contexts. The preliminary visual attribute dataset 700 created by the preliminary visual processing 200 is a dataset of visual attributes associated with a visual.

Semantic Concept Processing

After the preliminary visual processing 200, a semantic concept processing 310 is performed on the preliminary visual attribute dataset 700 as further seen in FIG. 1. The semantic concept processing 310 allows for general notions, taxonomies, and hierarchical structures to be associated with each of the attributes of the preliminary visual attribute dataset 700. The semantic concept processing 310 includes at least one of a hypernym/hyponym processing 311, holonym/meronym processing 312, and troponym processing 313, but preferably includes subjecting the preliminary visual attribute dataset 700 to all three processing as shown in FIG. 3.

For the hypernym/hyponym processing 311, each attribute within the preliminary visual attribute dataset 700 is run through a database containing hyponyms and hypernyms associated with various attributes. Relevant hypernyms and/or hyponyms are applied to each attribute of the preliminary visual attribute dataset 700 resulting in a hypernym/hyponym semantic concept attributes dataset 311a. Using grape as an example then with respect to the hypernyms, grape as a plant as a hypernym would lead to the hyponym phytonutrients, which is connected to flavonoids which is connected to flavonols, etc. And for grape with respect to hypernyms, starting with grape as a hyponym and moving upwards to identify hypernym attributes, grape would lead to nutrition.

For the holonym/meronym processing 312, each attribute within the preliminary visual attribute dataset 700 is run through a database containing holonyms and meronyms associated with various attributes. Relevant holonyms and meronyms are applied to each attribute of the preliminary visual attribute dataset 700 resulting in a holonym/meronym semantic concept attributes dataset 312a. Using the example 5 of grape would be attributed with fruit as the holonym of grape and seed or skin, or flesh as the meronym of grape.

For the troponym processing 313, each attribute within the preliminary visual attribute dataset 700 is run through a database containing troponyms associated with various attributes. Relevant troponyms are applied to each attribute of the preliminary visual attribute dataset 700 resulting in a troponym semantic concept attributes dataset 313a. As an example, if eat is associated with the image (such as when eating a grape), attributed troponym attributes may be snack or nibble. Note that the troponym processing 313 may be done bidirectionally. That is, if the word nibble or snack are found to be attributes, the attribute eat would then also be included.

For each of the hypernym/hyponym processing 311, holonym/meronym processing 312, and troponym processing 313, a bounding operation may, as necessary, also be performed for providing a reference pivot for an attribute. That is, one attribute may be bound to another attribute in order to prevent meaningless attribute results. An example of the bounding operation during the semantic concept processing would be binding the attribute "body" to another attribute such as "wine" so that during a processing such as the hypernym/hyponym processing 311, a variety of meaningless results such as with the attributes "head" or "ocean". The bounding operation may be done at one or more stages of the semantic concept processing 310.

For each of the hypernym/hyponym processing 311, holonym/meronym processing 312, and troponym processing 313, a free form operation may, as necessary, also be performed for providing an elaboration of an attribute in a long text form. That is, an attribute require further elaboration rather than a simple term or expression to provide a conceptual meaning. As an example of the free form operation during the semantic concept processing 310, the concept attribute of "anti-inflammation" is determined to have a relationship with "grape", and the free form operation may also associate the long text "research studies done with grape extracts" would be included as a concept. The free form operation may be done at one or more stages of the semantic concept processing 310.

After, preferably, running the preliminary visual attribute dataset 700 through each of the hypernym/hyponym processing 311, holonym/meronym processing 312, and troponym processing 313, each of the attributes of the preliminary visual attribute dataset 700 is likely to have a plurality of semantic concept attributes associated. The semantic concept attributes of each of the hypernym/hyponym semantic concept attributes dataset 311a, holonym/meronym semantic concept attributes dataset 312a, and/or troponym semantic concept attributes dataset 313a are synthesized into one combined semantic concept dataset 710 which includes all of the attributes of the hypernym/hyponym processing 311, holonym/meronym processing 312, and troponym processing 313.

Semantic Context Processing

When relationships between the preliminary visual attribute dataset 700 cut across the semantic concept dataset 710 the one or more relationships are defined as being related to the semantic context. In order to determine the semantic context of the attributes in the preliminary visual attribute dataset 700 and the semantic concept dataset 710, a semantic context processing 320 is conducted on the preliminary visual attribute dataset 700 and/or the semantic concept dataset 710 (See FIG. 1).

In the semantic context processing 320, the preliminary visual attribute dataset 700 and the semantic concept dataset 710 are compared against a context-specific structured database which includes predetermined contextual attribute combinations that equate with specific contexts. Preferably, both the preliminary visual attribute dataset 700 and the semantic concept dataset 710 are subjected to semantic context processing 320. The context-specific structured database used in the semantic context processing 320 may include master data, taxonomy, metadata, ontology, or semantic context references. The context-specific structured database used in the semantic context processing 320 may be derived from trusted publicly available sources, exclusively developed sources developed by subject-matter experts, or a combination thereof.

An example of the contextual relationships determined by the semantic context processing 320 is determining that the visual preliminary attributes of plants and soil from the preliminary visual attribute dataset 700 have a contextual relationship based on the context-specific structured database. Moreover, if the attribute soil from the preliminary visual attribute dataset 700 was linked with the concept-attribute "nutrients" during the semantic concept processing 310; the concept-attribute "nutrients" was further found to have a conceptual relationship with "phytonutrients"; and "phytonutrients" was found to have a further conceptual relationship with "resveratrol" (by means of the semantic concept processing 310); then, via the semantic context processing 320 which already has pre-determined concept specific relationships in the context-specific structured database, the visual attribute "grape" and the non-visual attribute "phytonutrients" are determined to have a contextual relationship through resveratrol.

One or both of the preliminary visual attribute dataset 700 and the semantic concept dataset 710 are subjected to the semantic context processing, and context specific attribute sets are determined for each of the attributes in each of the datasets. The context specific attribute sets are then synthesized into a single semantic context dataset 720.

For the semantic context processing 320, like with the semantic concept processing 310, a bounding operation may, as necessary, also be performed for providing a reference pivot for an attribute. However, in the case of the semantic context processing 320, an attribute is bound to a context relationship rather than an individual attribute. That is, one attribute may be bound to a relationship in order to prevent meaningless attribute results. As an example of the bounding operation during the semantic context processing 320, the attribute "system" (which without any other context has little meaning) is bound to the contextual relationship of "human body".

For the semantic context processing 320, like with the semantic concept processing 310, a free form operation may, as necessary, also be performed for providing further elaboration of an attribute in a long text form. As an example of the free form operation during the semantic context processing 320, the context attribute of "longevity" is determined to have a relationship with "resveratrol", and the free form operation may also associate the long text "increase expression of three genes all related to longevity: SirT1s. Fox0s, and PBEFs" would be included.

Semantic Marker Processing

As seen in FIG. 1, a semantic marker processing 330 is then preferably performed. Relationships between attributes within the semantic concept dataset 710 and/or the semantic context dataset 720 may also have their relationships described in specific terms as semantic markers. Semantic markers are used to describe more specifically the nature of the relationships which were determined during the semantic concept processing 310 or the semantic context processing 320. Semantic markers may be used to show aspects such as cause and effect, chronology, summation, rephrasing, features and more. The semantic concept processing 310 or the semantic context processing 320 may have yielded for example relationship results such as grape being related to raisin and wine. The semantic marker processing 330 relates specific markers such as "made into", "variety", "type of", "good for", "made of", or "benefits" with visual or non-visual attributes. The semantic marker processing relationships are determined based on available metadata or pre-defined semantic marker datasets (referred to as semantic marker metasets) which defines the semantic markers for specific relationships. Using the example of grape having a relationship with raisin or wine, the semantic marker relationship of grape "made into" raisin and wine can be determined. During the semantic marker processing a user may be asked to confirm one or more semantic marker relationships defined/assigned based on the semantic marker metasets. The confirmation may be done manually or automatically based on user settings. A user either during the processing or separately may also have the option to include new semantic markers if an appropriate semantic marker metaset is not provided.

If an attribute has multiple relationships described using semantic markers, then the markers can also be grouped together as a semantic marker collection. An example of a semantic marker collection for "Fruit" would be the semantic marker collection of "grown in", "made into". "type", "variety", "good for", etc. By grouping the semantic markers into a collection for an attribute, a user is able to look into available relationships of a semantic attribute regardless of whether on a concept level or context level.

The resultant dataset of visual and non-visual attributes with associated semantic markers is the semantic marker attribute dataset 730.

Semantic Realm Processing

As seen in FIG. 1, a semantic realm processing 340 is then preferably performed. At times, a domain of knowledge may intersect with many other domains which makes defining a specific concept associated with an attribute difficult. Instead, a semantic realm specifying a domain of knowledge may be associated with an attribute by means of the semantic realm processing 340. According to an embodiment of the current invention, the preliminary visual processing attribute dataset 700 and the semantic marker attribute dataset 730 are submitted to a semantic realm processing in which the attributes of the preliminary visual processing attribute dataset 700 and the semantic markers of the semantic marker attribute dataset 730 are assigned semantic domains (realms) which are not bound by structural and hierarchal natures found in the semantic concept attribute dataset 710 based on a pre-defined semantic realm database. For example preliminary visual processing attributes from the preliminary visual processing attribute dataset 700 may include the attributes human, store, brand, and/or company. These attributes are associated with the semantic realm "maker". Similarly the semantic marker "made by" is also associated with the semantic realm "maker".

As part of the semantic realm processing of defining/assigning attributes and semantic markers with realms, realms may further fall under one of two "super realms", specifically the super realms of "edible" or "non-edible". Generally, realms (domains) can also be assigned to one another to form a wider spectrum of semantics; however, if, for example, a realm is assigned to the super realm of "edible", then the realm cannot be assigned to the super realm of "non-edible" or any other realms associated with "non edible". For example the realm of "materials" would fall under the super realm of "nonedible" but the realm of "ingredients" would fall under the super realm of "edible". As a further example, the semantic markers "presents in", "in", or "contains" may be associated with the realm "chemistry". The semantic marker "presents in" could be associated with phytonutrients and grape, specifically in the form phytonutrients presents in grape. On the other hand, the semantic marker "contains" could be associated with grape and phytonutrients in the form of grape contains phytonutrients. However, "presents in", "in", or "contains" need not be associated with a super realm and are intended to be distinct from the semantic markers "made into" and "is made of" which infer production method involving humans or machinery which can be assigned to either the super realm "edible" or "non-edible" depending on whether the realm "materials" or "ingredients" is assigned to an associated attribute (not semantic marker).

Note that in the current embodiment, only "edible" and "non-edible" are used as super realms, but the invention is not limited thereto, and other "super realms" may be used within the semantic realm database. The semantic realm processing 340 associates a variety of realms with the preliminary visual processing attribute dataset 700 and the semantic markers of the semantic marker attribute dataset 730 and then synthesizes the results into a semantic realm attribute dataset 740.

Semantic Inheritance Repository Processing

Relationships between the semantic concepts attribute dataset 710 and semantic context attribute dataset 720 can be further extended to other attributes within the datasets 710, 720 by including member attributes that are in an SC relationship through a semantic inheritance processing 350 (See FIG. 1). The semantic inheritance processing can be used to indicate the hierarchal structures (taxonomy, hypernym/hyponym, holonym/meronym, or troponym) descendingly (to children attributes), ascendingly (to parent/root attributes) or in parallel (to siblings, i.e. attributes having the same parent attribute) of a corresponding attribute. The semantic inheritance processing 350 can be set to determine hierarchal structures for only one level, to n-levels or for all levels. The resulting extended semantic inheritance relationships of the attributes are then synthesized into a semantic inheritance attribute dataset 750. Semantic inheritance processing 350 can be switched on or off depending on a user's settings, privileges, and/or rights. In this embodiment the semantic inheritance processing is switched off by default.

An example of the semantic relationships determined based on the semantic inheritance processing 350 is when berry has a contextual relationship with the attribute health, and health has the semantic concepts anti-oxidant and anti-inflammation associated. The children attributes of berry for this contextual relationship will then also carry the semantic concepts of anti-oxidant and anti-inflammation. This semantic inheritance persists for each subsequent child level up to the number of levels defined by a user (i.e. one level, n-levels, or for all levels) or a pre-defined semantic inheritance database.

Semantic Instance Processing

After preferably obtaining the preliminary visual semantic attribute dataset 700, the semantic concept attribute dataset 710, the semantic context attribute dataset 720, the semantic marker attribute dataset 730, the semantic realm attribute dataset 740, and the semantic inheritance attribute dataset 750, a semantic instance processing 360 is performed (See FIG. 1). The semantic instance processing is a process for confirming and marking semantic definitions as instances of a unique visual. The semantic instance processing 360 is done by a user rather than the computing apparatus. In order to perform the semantic instance processing 360, the preliminary visual semantic attribute dataset 700, the semantic concept attribute dataset 710, the semantic context attribute dataset 720, the semantic marker attribute dataset 730, the semantic realm attribute dataset 740, and/or the semantic inheritance attribute dataset 750 are first displayed for a user. The user then confirms the semantic relationships that have been defined and/or assigned in the displayed datasets, and makes a selection of semantic entries based on definitions and/or assignments provided. Also depending on a user's permissions, a user may be able to remove semantic definitions. The final results of the semantic instance processing 360 yields a semantic instance attribute dataset 760 for a visual in which a list of visual and non-visual attributes which provide semantics for a visual.

Lexical Functions Processing

In addition to the aforementioned preliminary visual processing 200, semantic concept processing 310, the semantic context processing 320, semantic marker processing 330, semantic realm processing 340, semantic inheritance 350, and semantic instance processing 360, a lexical functions processing 370 can be performed on any of the preliminary visual semantic attribute dataset 700, the semantic concept attribute dataset 710, the semantic context attribute dataset 720, the semantic marker attribute dataset 730, the semantic realm attribute dataset 740, the semantic inheritance attribute dataset 750, or semantic instance attribute dataset 760, respectively. Preferably, the lexical functions processing is performed after the semantic instance processing 360 as seen in FIG. 1.

As seen in FIG. 4, the lexical function processing 370 is able to provide the semantic attribute definitions with synonyms, antonyms, and/or language constructs assistance. One or more of the preliminary visual semantic attribute dataset 700, the semantic concept attribute dataset 710, the semantic context attribute dataset 720, the semantic marker attribute dataset 730, the semantic realm attribute dataset 740, the semantic inheritance attribute dataset 750, or semantic instance attribute dataset 760 are subjected to the lexical function processing 370. The lexical function processing consists of subjecting at least one of the preliminary visual semantic attribute dataset 700, the semantic concept attribute dataset 710, the semantic context attribute dataset 720, the semantic marker attribute dataset 730, the semantic realm attribute dataset 740, the semantic inheritance attribute dataset 750, or semantic instance attribute dataset 760 to at least one of a synonym processing 371, an antonym processing 372, a grammatical processing 373, and a foreign language processing 374.

For the synonym processing 371, each attribute within the specific dataset being processed is compared with words in a database containing synonyms for various words to find words having the same or similar meanings to each attribute. Relevant synonyms are applied to each attribute of the dataset being processed resulting in a synonym attributes dataset 371a.

After completing the synonym processing 371, an antonym processing 372 is performed. For the antonym processing 372, each attribute within the specific dataset being processed is compared with words in a database containing antonyms for various words to find words having opposite meanings to each attribute. Relevant antonyms are applied to each attribute of the dataset being processed resulting in an antonym attributes dataset 372a.

Finally, after the antonym processing 372 is completed a grammatical processing 373 is performed. The grammatical processing 373, which is performed on each of the attributes in the dataset being processed, inserts language constructs such as prepositions, includes both singular and plural forms, provides variations of word forms with the same meaning, adjust the order of words in a phrase to enable natural language processing and reduces semantics processing redundancies, for assigned realms enforce the usage of variation in specified context/semantic domains, etc. The grammatical processing 373 results in a grammatical attributes dataset 373a.

The lexical functions processing 370 may further include a foreign language processing 374 in which a relevant foreign language vocabulary equivalent for each attribute of the dataset being processed may also be associated with the attribute. The foreign language vocabulary equivalent are determined based on one or more predefined foreign language databases. The foreign language processing 374 can be switched on or off depending on a user's settings. In this embodiment the foreign language processing 374 is switched off by default.

Note that for this embodiment the lexical functions processing 370 is performed as the final processing; however, the invention is not limited thereto and the lexical functions may conducted as a further processing for any of the preliminary visual processing 200, semantic concept processing 310, the semantic context processing 320, semantic marker processing 330, semantic realm processing 340, semantic inheritance 350, and semantic instance processing 360.

Another embodiment of the present invention, discloses a computing device in which visual and non-visual semantic attributes are associated with a visual comprising an interface which allows a user to input a visual and provide feedback and settings, a processor capable of performing at least a preliminary visual processing, a semantic concept processing, a semantic context processing, and a semantic instance processing, and a memory unit capable of storing processed datasets. The processor may also be capable of running a semantic marker processing, a semantic realm processing, a semantic inheritance processing and a lexical functions processing. The computing device is able to output the stored processor dataset results to the interface in a manner that allows a user to confirm and/or add relevant visual and non-visual semantic attributes. The computing device is also able to allow a user to remove irrelevant visual and non-visual semantic attributes from datasets when the user has the appropriate permissions. The final results of the lexical functions processing 370 yields a lexical functions attribute dataset 770 for a visual in which a list of visual and non-visual attributes which provide semantics for a visual.

According to any of the embodiments of the invention, any of the aforementioned resultant datasets provide a user with a list of relevant visual and non-visual attributes associated with the inputted visual.

Although the preferred embodiments of the present invention have been described in detail above, the present invention is not limited to the above-described embodiments, and various modifications and changes are possible within the scope of the gist of the present invention described in the claims.

REFERENCE SIGNS LIST

100 Initialization Process
200 Preliminary Visual Processing
210 Preliminary Semantic Element Processing
210p Preliminary Semantic Attributes
210px1 Primary Preliminary Semantic Attribute
210px2 Secondary Preliminary Semantic Attribute
210px3 Tertiary Preliminary Semantic Attribute
210pxn N-Th Level Preliminary Semantic Attribute
220 Modified Semantic Element Processing
220m Modified Semantic Attributes
220mx1 Primary Modified Semantic Attribute
220mx2 Secondary Modified Semantic Attribute
220mx3 Tertiary Modified Semantic Attribute
220mxn N-Th Level Modified Semantic Attribute
230 New Element Processing
230n New Semantic Attributes
230nx1 Primary New Semantic Attribute
230nx2 Secondary New Semantic Attribute
230nx3 Tertiary New Semantic Attribute
230nxn N-Th Level New Semantic Attribute
250 Consolidation Processing
300 Semantic Attribute Processing
310 Semantic Concept Processing
311 Hypernym/Hyponym Processing
311a Hypernym/Hyponym Semantic Concept Attributes Dataset
312 Holonym/Meronym Processing
312a Holonym/Meronym Semantic Concept Attributes Dataset
313 Troponym Processing
313a Troponym Semantic Concept Attributes Dataset
320 Semantic Context Processing
330 Semantic Marker Processing
340 Semantic Realm Processing
350 Semantic Inheritance Processing
360 Semantic Instance Processing
370 Lexical Functions Processing
371 Synonym Processing
371a Synonym Attributes Dataset
372 Antonym Processing
372a Antonym Attributes Dataset
373 Grammatical Processing
373a Grammatical Attributes Dataset
374 Foreign Language Processing
374a Foreign Language Attributes Dataset
700 Preliminary Visual Attribute Dataset
710 Semantic Concept Attribute Dataset
720 Semantic Context Attribute Dataset 730 Semantic Marker Attribute Dataset
740 Semantic Realm Attribute Dataset
750 Semantic Inheritance Attribute Dataset
760 Semantic Instance Attribute Dataset
770 Lexical Functions Attribute Dataset

CITATION LIST

Non Patent Literature

Non-Patent Document 1: KARPATHY, Andrej, FEI-FEI Li, Deep Visual-Semantic Alignments for Generating Image Descriptions, 2015 IEEE Conference on Computer Vision and Pattern Recognition (CVPR). Jun. 7-12, 2015

The invention claimed is:

1. In a digital medium classification environment, a method implemented by a computing device in which visual and non-visual semantic attributes are associated with a visual, the method comprising:
    an input step in which a visual is input into an apparatus for processing a visual,
    a preliminary visual processing step in which visual attributes of the visual are determined and synthesized into a preliminary visual attribute dataset,
    a semantic concept processing step in which each of the attributes in the preliminary visual attribute dataset has semantic concept relationships associated with each of the attributes within the preliminary visual attribute dataset, and the attributes and associated relationships are synthesized into a semantic concept attribute dataset,
    a semantic context processing step in which context-specific relationships between the attributes in the preliminary visual attribute dataset are determined and synthesized into a semantic context attribute dataset, and
    a semantic instance processing step in which a user confirms semantic definitions of the visual based on processed attribute datasets at least from the preliminary visual attribute dataset, the semantic concept attribute dataset, or the semantic context attribute dataset,
    wherein the preliminary visual processing step includes:
        a preliminary semantic element processing, wherein the visual is processed and a dataset of preliminary semantic attributes describing visible semantics of the visual is generated,
        at least one of a modified semantic element processing, wherein a dataset of modified semantic attributes is produced by removing unwanted preliminary semantic attributes from the dataset of preliminary semantic attributes or restricting specific preliminary attributes in the dataset of preliminary semantic attributes, and a new semantic element processing, wherein a dataset of new semantic attributes is produced by adding new semantic attributes to either the dataset of preliminary semantic attributes or the dataset of modified semantic attributes, and
        at least one consolidation processing for synthesizing the dataset of preliminary semantic attributes and at least one of the dataset of modified semantic attributes and the dataset of new semantic attributes into the preliminary visual attribute dataset by removing redundant attributes or grouping related groups of attributes.

2. The method according to claim 1, wherein the method further includes a semantic marker processing step, wherein a semantic marker attribute dataset is produced by using semantic markers to describe natures of relationships determined in the semantic concept or semantic context processing step in specific terms, after the semantic context processing step.

3. The method according to claim 2, wherein the method further includes a semantic realm processing step, wherein a semantic realm attribute dataset is produced by associating domains of knowledge with attributes in the preliminary visual attribute dataset, the semantic marker attribute dataset, or other domains of knowledge after the semantic marker processing step.

4. The method according to claim 1, wherein the method further includes a semantic inheritance processing step, wherein relationships between a first set of attributes in the semantic concept attribute dataset or the semantic context attribute dataset are extended to other attributes in semantic relationships with attributes in the first set of attributes, after the semantic context processing step.

5. The method according to claim 1, wherein the semantic instance processing step further includes making a selection of semantic entries based on definitions or assignments provided.

6. The method according to claim 1, wherein the method further includes a lexical functions step for providing the semantic definitions with synonyms, antonyms, grammatical processing or foreign language processing.

7. A computing device capable of performing a method in which visual and non-visual semantic attributes are associated with a visual comprising:
    an interface which allows a user to input a visual and provide feedback and settings,
    a processor capable of performing at least:
        a preliminary visual processing, wherein visual attributes of a visual are determined and synthesized into a preliminary visual attribute dataset, wherein the preliminary visual processing comprises:
            at least one of a modified semantic element processing, wherein a dataset of modified semantic attributes is produced by removing unwanted preliminary semantic attributes from a dataset of preliminary semantic attributes or restricting specific preliminary attributes in the dataset of preliminary semantic attributes, and a new semantic element processing, wherein a dataset of new semantic attributes is produced by adding new semantic attributes to either the dataset of preliminary semantic attributes or the dataset of modified semantic attributes, and
            at least one consolidation processing for synthesizing a dataset of preliminary semantic attributes and at least one of the dataset of modified semantic attributes and the dataset of new semantic attributes into the preliminary visual attribute dataset by removing redundant attributes and grouping related groups of attributes;
        a semantic concept processing, wherein each of the attributes in the preliminary visual attribute dataset has semantic concept relationships associated with each of the attributes within the preliminary visual attribute dataset, and the attributes and associated relationships are synthesized into a semantic concept attribute dataset;
        a semantic context processing, wherein context-specific relationships between the attributes in the preliminary visual attribute dataset are determined and synthesized into a semantic context attribute dataset; and a semantic instance processing, wherein a user confirms semantic definitions of the visual based on processed attribute datasets at least from the preliminary visual attribute dataset, semantic concept attribute dataset, or the semantic context attribute dataset, and a memory unit capable of storing processed datasets, wherein the computing device is able to output the stored processor dataset results to the interface in a manner that allows a user to confirm or add relevant visual and non-visual semantic attributes, and wherein the computing device is also able to allow a user to remove irrelevant visual and non-visual semantic attributes from datasets when the user has the appropriate permissions.

8. The computing device according to claim 7, wherein the processor is capable of running at least one of:

a semantic marker processing, wherein a semantic marker attribute dataset is produced by using semantic markers to describe natures of relationships determined in the semantic concept or semantic context processing in specific terms, a semantic realm processing, wherein a semantic realm attribute dataset is produced by associating domains of knowledge with attributes in the preliminary visual attribute dataset, the semantic marker attribute dataset, or other domains of knowledge after the semantic marker processing, a semantic inheritance processing, wherein relationships between a first set of attributes in the semantic concept attribute dataset or the semantic context attribute dataset are extended to other attributes in semantic relationships with attributes in the first set of attributes, a further semantic instance processing, wherein the user makes a selection of semantic entries based on definitions or assignments provided, and a lexical functions processing for providing the semantic definitions with synonyms, antonyms, grammatical processing or foreign language processing.

* * * * *